United States Patent [19]

Schwier et al.

[11] Patent Number: 5,245,005

[45] Date of Patent: Sep. 14, 1993

[54] PROCESS FOR THE PRODUCTION OF LINEAR AMORPHOUS POLYAMIDES WITH EXCESS DIAMINE

[75] Inventors: Chris E. Schwier; Richard D. Chapman, both of Pensacola, Fla.; Roger C. Ayotte, Springfield, Mass.

[73] Assignee: Monsanto Company, St. Louis, Mo.

[21] Appl. No.: 866,401

[22] Filed: Apr. 10, 1992

[51] Int. Cl.[5] ............................................. C08G 69/28
[52] U.S. Cl. ................................... 528/336; 528/335; 528/338; 528/339; 528/340; 528/344; 528/347
[58] Field of Search ............... 528/336, 347, 335, 338, 528/339, 340, 344

[56] References Cited

U.S. PATENT DOCUMENTS

| | | | |
|---|---|---|---|
| 2,130,948 | 9/1938 | Carothers | 528/336 |
| 3,825,508 | 7/1974 | Ashida et al. | |
| 4,018,746 | 4/1977 | Brinkmann et al. | |
| 4,060,517 | 11/1977 | Mertes et al. | |
| 4,219,636 | 8/1980 | Nielinger et al. | |
| 4,250,297 | 2/1981 | Nielinger et al. | |
| 4,264,762 | 4/1981 | Cordes et al. | |
| 4,383,083 | 5/1983 | Nielinger et al. | |
| 4,465,821 | 8/1984 | Nielinger et al. | |
| 4,820,765 | 4/1989 | Whyzmuzis | |

FOREIGN PATENT DOCUMENTS

| | | |
|---|---|---|
| 2706082 | 8/1978 | Fed. Rep. of Germany . |
| 2710636 | 9/1978 | Fed. Rep. of Germany . |
| 2729029 | 1/1979 | Fed. Rep. of Germany . |

Primary Examiner—Harold D. Anderson
Attorney, Agent, or Firm—Mary R. Bonzagni

[57] ABSTRACT

A process is disclosed for the production of linear amorphous polyamides which results in polyamides having more amine endgroups than acid endgroups. It comprises condensing an aqueous solution of salts comprising at least one aromatic diacid containing from 7 to 20 carbon atoms and a greater than equimolar amount of at least one aliphatic diamine containing from 4 to 20 carbon atoms.

9 Claims, No Drawings

PROCESS FOR THE PRODUCTION OF LINEAR AMORPHOUS POLYAMIDES WITH EXCESS DIAMINE

BACKGROUND OF THE INVENTION

1. Field of the Invention.

This invention relates to a process for the production of linear amorphous polyamides, which comprises condensing an aqueous solution of salts comprising at least one aromatic diacid and a greater than equimolar amount of at least one aliphatic diamine, wherein the resulting polyamides have more amine endgroups than acid endgroups. This invention also relates to linear amorphous polyamides as described above. These polyamides are typically clear and exhibit a good balance of toughness and processability. They can be used for medical, electrical, and cosmetic applications.

2. Description of the Prior Art

Polyamides prepared from dicarboxylic acids (diacids) and diamines are known. In particular, polyamides prepared from equimolar amounts of either aliphatic diacids and aliphatic diamines or aromatic diacids and aliphatic diamines are known. Depending on their composition, these polyamides are either crystalline or amorphous. They may be prepared by known processes, for example, by condensing an aqueous salt solution of equimolar amounts of diacid and diamine monomers, optionally, compensating for losses of diamine occurring during the condensation reaction by adding or using an excess of diamine. The use of a diamine in amounts greater than anticipated to compensate for loss during the condensation reaction has been known to cause reaction mixture cross-linking during production.

Polyamides prepared from equimolar amounts of aromatic diacids, such as isophthalic acid and/or terephthalic acid and aliphatic diamines, in addition to amounts of diamine monomer sufficient to compensate anticipated processing losses, tend to be notably more viscous and less easily processed than polyamides prepared from aliphatic diacids and diamines. In extreme cases, these polyamides are cross-linked and, therefore, unprocessable.

It is generally known that aromatic diacids, such as isophthalic acid and terephthalic acid, polymerize more slowly than the standard aliphatic diacids used to make nylon 66, 69, 610, or 612. It is believed that the slower polymerization rate allows competing degradation reactions to become more significant. It is also believed that these degradation reactions lead to branching in the polyamide molecule, thereby resulting in a decrease in or loss of processability.

It is therefore an object of the present invention to provide a process for the production of linear amorphous polyamides prepared from aromatic diacids and aliphatic diamines, wherein the resulting polyamides exhibit a good balance of properties, including good processability.

It is a further object of the present invention to provide linear amorphous polyamides as described hereinabove.

SUMMARY OF THE INVENTION

Accordingly, the present invention provides a process for the production of linear amorphous polyamides which comprises condensing an aqueous solution of salts comprising at least one aromatic diacid, such as isophthalic acid, terephthalic acid, or a mixture of isophthalic acid and terephthalic acid, and a greater than equimolar amount of at least one aliphatic diamine, such as hexamethylene diamine. The additional amount of diamine employed is greater than the anticipated amount lost during processing and, therefore, the resulting polyamides have more amine endgroups than acid endgroups.

The present invention also provides a linear amorphous polyamide formed from a mixture comprising at least one aromatic diacid and a greater than equimolar amount of at least one aliphatic diamine where the polyamide has more amine endgroups than acid endgroups. The inventive polyamide is typically clear and exhibits a good balance of toughness and processability.

PREFERRED EMBODIMENTS

The aromatic diacid component used in the present invention contains from 7 to 20 carbon atoms and preferably contains from 8 to 14 carbon atoms. Most preferred is a dicarboxylic acid having the carboxylic groups located in the meta- or para- position or mixtures thereof.

Suitable aromatic diacids include isophthalic, terephthalic, diphenyl, and naphthalene dicarboxylic acids and mixtures thereof. Isophthalic, terephthalic or mixtures of isophthalic and terephthalic acid are preferred.

The aliphatic diamine component used in the present invention contains from 4 to 20 carbon atoms and preferably contains from 6 to 12 carbon atoms.

Suitable aliphatic diamines include tetramethylene diamine, pentamethylene diamine, hexamethylene diamine, octamethylene diamine, dodecamethylene diamine and mixtures thereof. Hexamethylene diamine or diamine mixtures containing hexamethylene diamine are preferred.

The polyamides of the present invention can be prepared by a process which includes condensation of an aqueous solution of salts of at least one aromatic diacid and a greater than equimolar amount of at least one aliphatic diamine. The amount of diamine employed in this inventive process insures that the resulting polyamide has more amine endgroups than acid endgroups. In accordance therewith, the ratio of the equivalents of the diamine component to the equivalents of the diacid component is greater than 1, preferably greater than 1.03, and more preferably greater than 1.05. Stated another way, the amount of diamine monomer employed, in addition to the equimolar or equivalent amount, in the inventive process, is preferably greater than 3% by weight and, more preferably, greater than 5% by weight, based on the total weight of the diamine in the aqueous solution. It is believed that the use of this additional amount of diamine monomer serves to suppress the branching formation that occurs during the condensation reaction, thereby resulting in more linear molecules.

In a preferred embodiment, the inventive process includes the following steps:

1) combining substantially equimolar aqueous solutions of at least one aromatic diacid monomer and at least one aliphatic diamine monomer to form an aqueous solution of salts of the monomers;

2) adding greater than 3% by weight, and preferably, adding greater than 5% by weight, based on the total weight of the diamine monomer(s) in the solution, of the aliphatic diamine monomer(s) to the aqueous salt solution;

3) optionally adding an effective amount of a phosphorus containing acid catalyst to the aqueous salt solution;

4) heating the aqueous salt solution to temperatures above 100° C. under pressure while removing steam;

5) reducing the pressure exponentially to approximately 0.1 MPa;

6) continuing heating the aqueous salt solution to temperatures above 100° C.;

7) maintaining the temperature until the reaction is substantially complete; and 8) recovering the resulting polyamide.

Suitable phosphorus containing acid catalysts for use in the inventive process include those acids of the following formula:

wherein R is a member selected from the group consisting of a hydrogen atom, an alkyl group of 1 to 15 carbon atoms, a cycloalkyl group, an aralkyl group, and an aryl group, m is 0 or 1, and m+n is 2; esters thereof, and the salts of the acids.

Acids expressed by formula (1) include phosphorous acid, hypophosphorous acid and organo-phosphinic acids.

Suitable organo-phosphinic acid catalysts for use in the inventive process include methylphosphinic acid, ethylphosphinic acid, isobutylphosphinic acid, n-propylphosphinic acid, isopropylphosphinic acid, iso-amylphosphinic acid, n-heptylphosphinic acid, n-octyl-phosphinic acid, benzene phosphinic acid, benzylphosphinic acid, cyclohexylphosphinic acid, phenylphosphinic acid, 2-methylphenylphosphinic acid, 3-methylphenylphosphinic acid, 4-methylphenylphosphinic acid, 4-ethylphenylphosphinic acid, 2,4-dimethylphenylphosphinic acid, 2,5-dimethylphenylphosphinic acid, 2,4,5-trimethylphenylphosphinic acid, 2,4,6-trimethylphenylphosphinic acid, 4-isopropylphenylphosphinic acid, 4-phenylphenylphosphinic acid, 4-benzylphenylphosphinic acid, 1-naphthylphosphinic acid, and 2-naphthylphosphinic acid.

The esters thereof are $C_1$-$C_{18}$ alkylesters, aralkylesters or arylesters of these acids. Examples of these esters include monoesters such as methyl phosphonic acid, ethyl phosphonic acid, n-propyl phosphonic acid, isopropyl phosphonic acid, n-butyl phosphonic acid, iso-butyl phosphonic acid, iso-amyl phosphonic acid, n-octyl phosphonic acid, phenyl phosphonic acid, 1-naphthyl phosphonic acid or 2-naphthyl phosphonic acid; diesters such as dimethyl phosphonate, diethyl phosphonate, di(n-propyl) phosphonate, di(n-butyl) phosphonate, di(n-propyl) phosphonate, di(n-butyl) phosphonate, di(iso-butyl) phosphonate, di(iso-amyl) phosphonate, di(neo-pentyl) phosphonate, di(n-hexyl) phosphonate, di(n-heptyl) phosphonate, dibenzyl phosphonate, or diphenyl phosphonate; and triesters such as trimethyl phosphite, triethyl phosphite, tri-(n-propyl) phosphite, tri(iso-propyl) phosphite, tri(n-butyl) phosphite, tri(isobutyl) phosphite, tri(iso-amyl) phosphite, tri(n-octyl) phosphite, triphenylphosphite, tri(4-tert-butylphenyl) phosphite, tri(2-methylphenyl) phosphite, tri(3-methylphenyl) phosphite, tri(4-methylphenyl) phosphite, tri(1-naphthyl) phosphite, tri(2-naphthyl) phosphite, diphenyl propyl phosphite, diphenyl butyl phosphite, diphenyl 4-tert-butylphenyl phosphite, or phenyl di(4-tert-butylphenyl) phosphite.

The salts of the acids are alkali metal salts of the acids and ammonium salts formed between the acids and ammonia or amines. Specific examples include lithium phosphite-monobasic, lithium phosphite-dibasic, lithium hypophosphite, lithium phenylphosphinate, lithium cyclohexylphosphinate, sodium phosphite-monobasic, sodium phosphite-dibasic, sodium hypophosphite, sodium phenylphosphinate, sodium methylphosphinate, sodium ethylphosphinate, sodium cyclohexylphosphinate, potassium phosphite-monobasic, potassium phosphite-dibasic, potassium hypophosphite, potassium phenylphosphinate, potassium cyclohexylphosphinate, ammonium phosphite-monobasic, ammonium phosphite-dibasic, ammonium hypophosphite, ammonium methylphosphinate, ammonium ethylphosphinate, ammonium cyclohexylphosphinate, ammonium phenylphosphinate, ethylene diammonium phosphite, ethylene diammonium hypophosphite, hexamethylene diammonium phosphite, hexamethylene diammoniumhypophosphite, hexamethylenediammonium ethylphosphinate, hexamethylene diammonium cyclohexylphosphinate, hexamethylene diammonium phenylphosphinate, piperazine diammonium phosphite, piperazine diammonium hypophosphite, or piperazine diammonium phenyl phosphinate.

The preferred phosphorus containing acid catalyst is benzene phosphinic acid.

It is preferred that the phosphorus containing acid catalyst be present in the inventive process in the amount of from about 0.01% to about 1.0% by weight, based on the total weight of the monomers and, more preferably, in the amount of from about 0.10% to about 0.50% by weight. The addition of the phosphorus containing acid catalyst in the inventive process is disclosed as being optional, wherein polyamides resulting from the process not employing the catalyst are typically clear and demonstrate acceptable levels of toughness and processability.

The polyamides of the present invention can contain auxiliaries and additives, for example, lubricants, mold release agents, dyes, glass fibers, fillers, or flame-proofing agents, so long as and to the extent that these auxiliaries and additives do not adversely affect the processability of the resulting polyamides.

The invention is further illustrated by the following examples which are not to be construed as limiting.

SPECIFIC EMBODIMENTS

1. Condensation of the Salt

In a control sample and test sample, 260 kg. and 3,252 kg., respectively, of a 40% solution of substantially equimolar quantities of isophthalic acid (ISA) and hexamethylene diamine (HMD) in water were prepared. To the test solution was added 1.1 kg. of benzene phosphinic acid catalyst (BPA) and 17 kg. of HMD. Both solutions were then heated in autoclaves under 1.7 MPa pressure, removing steam, until the temperature of each respective solution reached 245° C. The pressure in each autoclave was then reduced exponentially to atmospheric pressure over 25 minutes and heating continued to raise the temperature of each to 290° C. The temperature was maintained for both materials for about 30 minutes. The resulting materials were then extruded from the autoclaves into strands, quenched in water and pelletized.

The pellets, as prepared, contained about 0.2% moisture. In an effort to obtain polyamide samples of differing molecular weights, the pellets were moisturized to different levels. A portion of the pellets were exposed and allowed to absorb moisture from the air until a moisture level of 0.25% was obtained. The remaining pellets were dried in a vacuum oven at 70° C. for 2 to 8 hours depending on the amount of moisture to be removed. The moisture levels were determined, via Karl Fisher titration of the devolatilized moisture (ASTM #D-789) and are set forth below in Table I.

2. Injection Molding

The moisturized pellets were spiral molded and also molded into 12.7 cm.×1.27 cm.×(0.32 cm. or 0.64 cm.) Izod impact test specimens and 7.62 cm.×7.62 cm.×0.03 cm. plaques for dart impact testing using a Van Dorn injection molding machine (Model No. 125-RS-6) utilizing the following molding conditions:

|  | Impact Specimens, Plaques | Spiral Molded Specimens |
|---|---|---|
| Nozzle Temperature, °C. | 295 | 305 |
| Set Temperature, °C., |  |  |
| Zone 1 | 295 | 305 |
| 2 | 295 | 300 |
| 3 | 250 | 250 |
| Stock Temperature, °C. | 320 | 332 |
| Mold Temperature, °C. | 80 | 100 |
| Injection Time, sec. | 1.0 | 1.0 |
| Booster Pressure, MPa | 6.2 to 9.0 | 10.3 |
| Hold Pressure, MPa | 4.8 to 7.6 | 9.0 |
| Back Pressure, MPa | 0.34 | 0.34 |
| Injection Forward Time, sec. | 20 | 20 |
| Booster Time, sec. | 5 | 5 |
| Mold Closed Time, sec. | 20 | 30 |

TEST METHODS

The molded specimens were tested for Izod impact strength per ASTM #D-256; dart impact strength per ASTM #D-3763; and Spiral Flow or processability per ASTM #D-3123.

Viscosity molecular weight determinations reported as "viscosity number" were carried out on the molded samples as per International Standard (ISO) #307. The solvent used was sulfuric acid and the thermostatic bath was maintained at 25° C. It was generally found that as the moisture level in the samples increased the molecular weight decreased.

EXAMPLES C1 TO C4 AND 1 TO 4

Control Examples C1 to C4, which were prepared without the benefit of additional HMD and a catalyst, were tested for processability and impact properties.

Examples 1 to 4, which were prepared using 3% additional HMD, based on the total weight of HMD, and 0.1% BPA, based on the total weight of ISA and HMD, were also tested.

The results are tabulated in Table I.

TABLE I

| SUMMARY OF EXAMPLES C1 TO C4 AND 1 TO 4 | | | |
|---|---|---|---|
| EXAMPLE | MOISTURE LEVEL (%) | SPIRAL FLOW (cm.) | DART IMPACT (J) | IZOD IMPACT (kJ/m$^2$) |
| C1 | 0.25 | 45.7 | 18.71 | 4.69 |
| C2 | 0.15 | 40.1 | 55.03 | 5.35 |
| C3 | 0.08 | 31.0 | 57.87 | 6.39 |
| C4 | 0.03 | 22.9 | 67.45 | 6.38 |
| 1 | 0.25 | 82.6 | 1.27 | 2.64 |
| 2 | 0.15 | 73.7 | 14.38 | 3.83 |
| 3 | 0.08 | 69.1 | 34.90 | 5.01 |
| 4 | 0.03 | 40.9 | 64.12 | 6.62 |

It is apparent from the results listed in Table I that the balance of toughness/processability is better for Examples 1 to 4 as compared to Control Examples C1 to C4. In particular, the processability of the inventive polyamides of Examples 1 to 4 is twice that observed for the Control Examples with comparable impact properties observed at the higher end of the molecular weight range tested.

Having thus described the invention, what is claimed is:

1. A process for the production of linear amorphous polyamides which comprises:
   a. combining aqueous solutions of at least one aromatic diacid monomer and a greater than equimolar amount of at least one aliphatic diamine monomer to form an aqueous solution of salts of the monomers
   b. wherein the amount of the aliphatic diamine monomer(s) present, in addition to the equimolar or equivalent amount, is greater than 3% by weight, based on the total weight of the diamine monomer(s) in the solution;
   b. adding an effective amount of a phosphorous containing acid catalyst to the aqueous salt solution;
   c. heating the aqueous salt solution to temperatures above 100° C. under pressure while removing steam;
   d. reducing the pressure exponentially to approximately 0.1 mega-pascal;
   e. continuing heating the aqueous salt solution to temperatures above 100° C.;
   f. maintaining the temperature until the reaction is substantially complete; and
   g. recovering the resulting polyamide.

2. The process of claim 2 wherein aromatic diacid(s) contains from 7 to 20 carbon atoms.

3. The process of claim 2 wherein the aromatic diacid is isophthalic acid or a mixture of isophthalic acid and terephthalic acid.

4. The process of claim 1 wherein the aliphatic diamine(s) contains from 4 to 20 carbon atoms.

5. The process of claim 4 wherein the aliphatic diamine is hexamethylene diamine.

6. The process of claim 1 wherein the phosphorus containing acid catalyst is an organo-phosphinic acid catalyst selected from the group consisting of methylphosphinic acid, ethylphosphinic acid, isobutylphosphinic acid, n-propylphosphinic acid, isopropylphosphinic acid, iso-amylphosphinic acid, n-heptylphosphinic acid, n-octylphosphinic acid, benzene phosphinic acid, benzylphosphinic acid, cyclohexylphosphinic acid, phenylphosphinic acid, 2-methylphenylphosphinic acid, 3-methylphenylphosphinic acid, 4-methylphenylphosphinic acid, 4-ethylphenylphosphinic acid, 2,4-dimethylphenylphosphinic acid, 2,5-dimethylphenylphosphinic acid, 2,4,5-trimethylphenylphosphinic acid, 2,4,6-trimethylphenylphosphinic acid, 4- isopropylphenylphosphinic acid, 4-phenylphenylphosphinic acid, 4-benzylphenylphosphinic acid, 1-naphthylphosphinic acid, and 2-naphthylphosphinic acid.

7. The process of claim 6 wherein the organo-phosphinic acid catalyst is benzene phosphinic acid.

8. The process of claim 6 wherein the effective amount of the organo-phosphinic acid catalyst is from about 0.01% to about 1.0% by weight based on the total weight of the monomers.

9. A linear amorphous polyamide obtained according to the process of claim 1, wherein the aromatic diacid is selected from the group consisting of isophthalic, terephthalic, diphenyl, and naphthalene dicarboxylic acids and mixtures thereof.

* * * * *

UNITED STATES PATENT AND TRADEMARK OFFICE
CERTIFICATE OF CORRECTION

PATENT NO. : 5,245,005
DATED : September 14, 1993
INVENTOR(S) : SCHWIER ET AL.

It is certified that error appears in the above-indentified patent and that said Letters Patent is hereby corrected as shown below:

Column 6, Table 1, line 9, delete "6.62" and after "64.12" insert --5.62--

Column 6, line 28, claim 1, delete "b."

Column 6, line 45, claim 2, delete "claim 2" and after "process of" insert --claim 1--

Signed and Sealed this

Twenty-ninth Day of March, 1994

Attest:

BRUCE LEHMAN

Attesting Officer

Commissioner of Patents and Trademarks